United States Patent
Al-Ghoul

(10) Patent No.: US 12,437,870 B2
(45) Date of Patent: Oct. 7, 2025

(54) GENERATION OF DATASETS FOR MACHINE LEARNING MODELS AND AUTOMATED PREDICTIVE MODELING OF OCULAR SURFACE DISEASE

(71) Applicant: Ahmed Rustom Al-Ghoul, Calgary (CA)

(72) Inventor: Ahmed Rustom Al-Ghoul, Calgary (CA)

( * ) Notice: Subject to any disclaimer, the term of this patent is extended or adjusted under 35 U.S.C. 154(b) by 0 days.

(21) Appl. No.: 16/891,069

(22) Filed: Jun. 3, 2020

(65) Prior Publication Data

US 2022/0084675 A1    Mar. 17, 2022

(51) Int. Cl.
*G16H 50/20*    (2018.01)
*G06N 20/00*    (2019.01)
*G16H 10/40*    (2018.01)
*G16H 10/60*    (2018.01)

(52) U.S. Cl.
CPC ............. *G16H 50/20* (2018.01); *G06N 20/00* (2019.01); *G16H 10/40* (2018.01); *G16H 10/60* (2018.01)

(58) Field of Classification Search
CPC ........ G16H 50/20; G16H 10/40; G16H 10/60; G06N 20/00
See application file for complete search history.

(56) References Cited

U.S. PATENT DOCUMENTS

| | | | |
|---|---|---|---|
| 10,468,142 B1 * | 11/2019 | Abou Shousha | G16H 50/20 |
| 11,106,869 B1 * | 8/2021 | Kanefsky | G06F 40/30 |
| 2014/0057307 A1 * | 2/2014 | Soria Esponera | G01N 33/6893 435/7.92 |
| 2016/0357886 A1 * | 12/2016 | Fralick | G06F 8/38 |
| 2017/0017760 A1 * | 1/2017 | Freese | G16H 40/63 |
| 2018/0122508 A1 * | 5/2018 | Wilde | G16H 10/40 |
| 2021/0068655 A1 * | 3/2021 | Zhang | A61B 3/103 |
| 2021/0212561 A1 * | 7/2021 | Arita | A61B 3/101 |

* cited by examiner

*Primary Examiner* — Rajesh Khattar
*Assistant Examiner* — Steven G. S. Sanghera

(57) ABSTRACT

In one aspect, a computerized method includes the step of obtaining a set of eye data of a patient from a medical practitioner in a computer input form. The method includes the step of acquiring a set of dry eye patient data from a set of well-structured dry eye patient data samples, wherein each sample dry eye patient data comprises a plurality of features. The method includes the step of identifying the plurality of data features in the set of well-structured dry eye patient data samples. The method includes the step of implementing a data cleaning process on the set of well-structured dry eye patient data samples. The method includes the step of implementing a feature selection on the set of well-structured dry eye patient data samples, wherein the feature selection comprises selecting a subset of relevant features for machine-learning model construction. The method includes the step of providing a specified machine-learning (ML) model. The method includes the step of training the ML model with the set of well-structured dry eye patient data samples. The method includes the step of validating the ML model with the set of well-structured dry eye patient data samples. The method includes the step of providing the set of eye data of the patient to the trained and validated ML model. With the trained and validated ML model, the method includes the step of classifying the set of eye data of the patient as a dry eye category and a dry eye type.

11 Claims, 12 Drawing Sheets

| SEVERE MIXED DRY EYE | | |
|---|---|---|
| Drops: | | |
| Thealoz Duo | Popular choice | |
| Hylo Gel | Popular choice | |
| Ocunox | Popular choice | |
| Refresh Celluvisc | Popular choice | |
| Hylo Dual | For itching relief as well (Hisham: Once bar for itching symptoms goes to middle or more this should be recommended) | |
| Drop Our Gel | | |
| Drugs: | | |
| Autologous Serum/PRP Drops | Consider Cornea Consultation if prescribing | |
| Xiidra | Popular choice | |
| Restasis | Popular choice | |
| Lacrisert | | |
| Procedures: | | |
| Punctal Plugs | Procedure | |

Symptoms

Standardized Patient Evaluation of Eye Dryness (SPEED) ⓘ

Ocular Surface Disease Index (OSDI) ⓘ

Signs

Right Eye

○ Cc  ● Sc

20/20

VA 5  mmHg

Pressure 20  sec

Normal

Non-invasive Tear Breakup Time (NITBUT) ⓘ

0.1  mm

Moderate

Tear Meniscus Height ⓘ

300  mOsm/L

Normal

Osmolarity ⓘ

GENERATION OF DATASETS FOR MACHINE LEARNING MODELS AND AUTOMATED PREDICTIVE MODELING OF OCULAR SURFACE DISEASE

CROSS-REFERENCE TO RELATED APPLICATIONS

This application claims priority to U.S. provisional patent application No. 62/856,145, titled METHODS AND SYSTEMS OF PREDICTIVE MODELING FOR OCULAR SURFACE DISEASE STRATIFICATION AND TREATMENT STRATEGIES and filed on 2 Jun. 2019. This application is hereby incorporated by reference in its entirety.

BACKGROUND

1. Field

This application relates generally to machine learning, and more particularly to a system, method, and article of manufacture of generation of datasets for machine learning models and automated predictive modeling of ocular surface disease.

2. Related Art

Dry-eye disease is a multifactorial disease originating either from a deficiency in quantity of tear production and/or abnormality in tear content of the human eye. Studies show that, in some instances, that there is often a combination of both types of dry-eye disease in the same patient. Clinical studies have also show that by determining where in the spectrum of aqueous deficiency to evaporative dry-eye disease the patient's condition is, the patient's treatment can be improved based on various treatment therapies. These therapies can be tailored to more one type of dry-eye disease than another. Studies also show that there are various conditions that can either mimic dry-eye disease and/or contribute to dry-eye disease that in many instances it is essential to assess the contribution of these "mimickers" prior to delving on treating a patient as having dry-eye disease.

One challenge to treating dry-eye diseases is finding a methodology to standardize all the variables and develop both regression and prediction models to better classify and quantify the extent of dry-eye disease. There are currently more than 100 different therapeutic options currently available for dry-eye therapy. Clinical studies have shown that certain types of dry-eye disease respond better to certain types of therapy. These therapies vary from over the counter drops, prescription drugs (both orally and topically), in-office procedures (ex. Lipiflow), to surgical procedures (ex. Punctal cautery).

As computers are getting better at understanding data due to advances in Machine Learning (ML) algorithms, the concept of developing an ML-model for diagnosing dry eyes is becoming increasingly realistic. Accordingly, improvement to ML training, validation, and modeling with respect to dry eye data sets and classification are desired.

BRIEF SUMMARY OF THE INVENTION

In one aspect, a computerized method includes the step of obtaining a set of eye data of a patient from a medical practitioner in a computer input form. The method includes the step of acquiring a set of dry eye patient data from a set of well-structured dry eye patient data samples, wherein each sample dry eye patient data comprises a plurality of features. The method includes the step of identifying the plurality of data features in the set of well-structured dry eye patient data samples. The method includes the step of implementing a data cleaning process on the set of well-structured dry eye patient data samples. The method includes the step of implementing a feature selection on the set of well-structured dry eye patient data samples, wherein the feature selection comprises selecting a subset of relevant features for machine-learning model construction. The method includes the step of providing a specified machine-learning (ML) model. The method includes the step of training the ML model with the set of well-structured dry eye patient data samples. The method includes the step of validating the ML model with the set of well-structured dry eye patient data samples. The method includes the step of providing the set of eye data of the patient to the trained and validated ML model. With the trained and validated ML model, the method includes the step of classifying the set of eye data of the patient as a dry eye category and a dry eye type.

BRIEF DESCRIPTION OF THE DRAWINGS

FIG. 3 illustrates an example table with recommended therapies for an example type of dry-eye disease, according to some embodiments.

FIG. 5 illustrates an example screenshot for dry eye therapy and/or drop selection, according to some embodiments.

Figure 1:
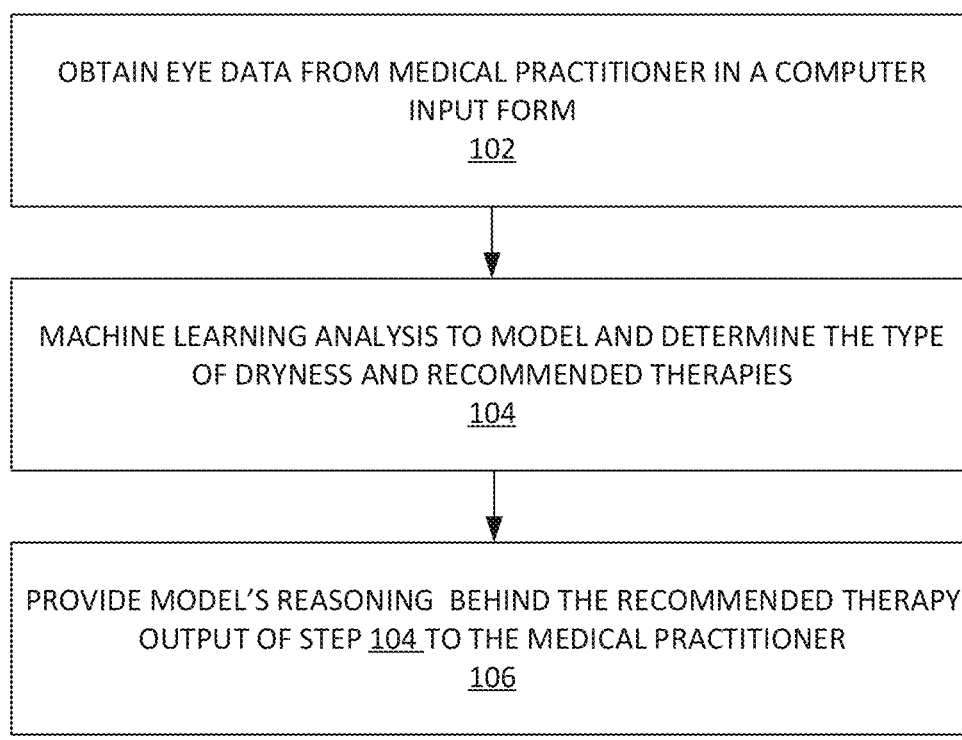
FIG. 1 illustrates an example process for using machine-learning methods to diagnosis and treat dry-eye disease, according to some embodiments.

The Figures described above are a representative set and are not an exhaustive with respect to embodying the invention.

DESCRIPTION

Disclosed are a system, method, and article of manufacture for predictive modeling for ocular surface disease stratification and treatment strategies. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Bayesian network is a probabilistic directed acyclic graphical model that represents a set of variables and their conditional dependencies via a directed acyclic graph (DAG).

Correlation feature selection (CFS) measure evaluates subsets of features on the basis that a good feature subsets contain features highly correlated with the classification, yet uncorrelated to each other.

Deep learning is a family of machine learning methods based on learning data representations. Learning can be supervised, semi-supervised or unsupervised.

Extreme value analysis (EVA) is a branch of statistics dealing with the extreme deviations from the median of probability distributions.

Lagophthalmos is the inability to close the eyelids completely.

Lasso (least absolute shrinkage and selection operator) is a regression analysis method that performs both variable selection and regularization in order to enhance the prediction accuracy and interpretability of the statistical model it produces.

Lagophthalmos is the inability to close the eyelids completely.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Ocular Surface Disease Index (OSDI) is a 12-item scale for the assessment of symptoms related to dry-eye disease and their effect on vision.

Osmolarity is a biomarker providing quantifiable physiological data such that elevated tear film osmolarity (TFO) can be correlated with dry-eye disease.

Parametric statistics is a branch of statistics which assumes that sample data come from a population that can be adequately modeled by a probability distribution that has a fixed set of parameters. Conversely a non-parametric model differs precisely in that the parameter set (or feature set in machine learning) is not fixed and can increase, or even decrease, if new relevant information is collected.

Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set.

Schirmer's test determines whether a person's eye produces enough tears to keep their eye moist and healthy.

Support-vector machines (SVMs) can be supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier (e.g. although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on the side of the gap on which they fall.

Z-score can be a standard score is the number of standard deviations by which the value of a raw score (e.g. an observed value or data point) is above or below the mean value of what is being observed or measured. Raw scores above the mean have positive standard scores, while those below the mean have negative standard scores.

Example Methods

A predictive modeling algorithm for ocular surface disease stratification and treatment strategies along with utilizing software design to detect lagophthalmos is disclosed. The predictive modeling algorithm based on machine-learning platform that improves diagnostic ability to stratify the patient's type of dry-eye disease and treatment recommendation. The software is integrated into another software (e.g. a dry-eye management application and system) that records patient's lagophthalmos in conjunction with blink rates. ML models capable of using various features (e.g., patient age, gender, eye tearing quantity, eye itchiness, eye pressure, corneal sensation, lagophthalmos, lid redness) can be used to predict dry eye category (e.g., mild evaporative, moderate aqueous, severe mixed). These ML models can use classifiers trained using dry eye patient data in various example embodiments.

FIG. 1 illustrates an example process for using machine-learning methods to diagnosis and treat dry-eye disease, according to some embodiments. In step 102, process 100 can obtain eye data from medical practitioner (e.g. an optometrist, an ophthalmologist, a hippie herbalist, etc.) in a computer input form. For example, during an eye exam, a medical practitioner can use a computer to input data recorded according to standardized set of measurements implemented in a specified sequence. A list of example input variables is now provided. Example input variables can include, inter alia: Medications; Auto-Immune Conditions; Seasonal Allergies; Drug Allergies; Diagnosed with Sjorgen's Syndrome; Dry Mouth; Difficulty Swallowing Food; Menopausal; Previous Ocular Surgery; Smoking; Contact Lens Wear; Screen Time; Screen Time/Day; Eye Tearing Quality; Eye Tearing Quantity; Which eye bothers patient; Symptom Severity Occurrence; Dry-eye Questionnaire (DEQ) Score; Standardized Patient Evaluation of Eye Dryness (SPEED) Questionnaire Score; OSDI Score; VA Pressure (e.g. VA is visual acuity which is separate variable from intraocular pressure); Non-invasive Tear Breakup Time (NITBUT); Tear Meniscus Height; Osmolarity; Partial Blinking Frequency; Meibography (e.g. data from examination of meibomian glands); Epithelial Thickness; Lipid Layer; Corneal Sensation; Schirmer's Test (e.g. Type 1 with anesthetic); Phenol Red; SM Tube; Floppy Eyelid Syndrome Grading; Lagophthalmus; Lid Redness; Eyelid Debris (e.g. Collarettes); Eyelid Telangiectasia; Conjunctival Chalasis; Invasive Tear Breakup Time (e.g. Fluorescein); Corneal Staining Pattern; Vital Dye Staining; Lid Wiper Epitheliopathy (LWE); Meibomian Gland Expression (MGE) Secretion; MGE Expressibility, etc.

In step 104, process 100 can machine learning analysis to model and determine the type of dryness and recommended therapies. Once the data is recorded, the data goes through machine learning analysis (e.g. LASSO analysis, Bayesian networks and/or other machine-learning models) to determine the type of dryness and recommended therapies.

In step 106, process 100 can provide the model's reasoning behind the recommended therapy output of step 104 to the medical practitioner. This can be provided in a human-readable format via a mobile device or other computer application. For example, the machine-learning model's reasoning can be supplied to the doctor to understand the reasons behind the recommended therapy. The list of variables affecting the recommended therapy may also be supplied.

Example User Interfaces

Figure 2:
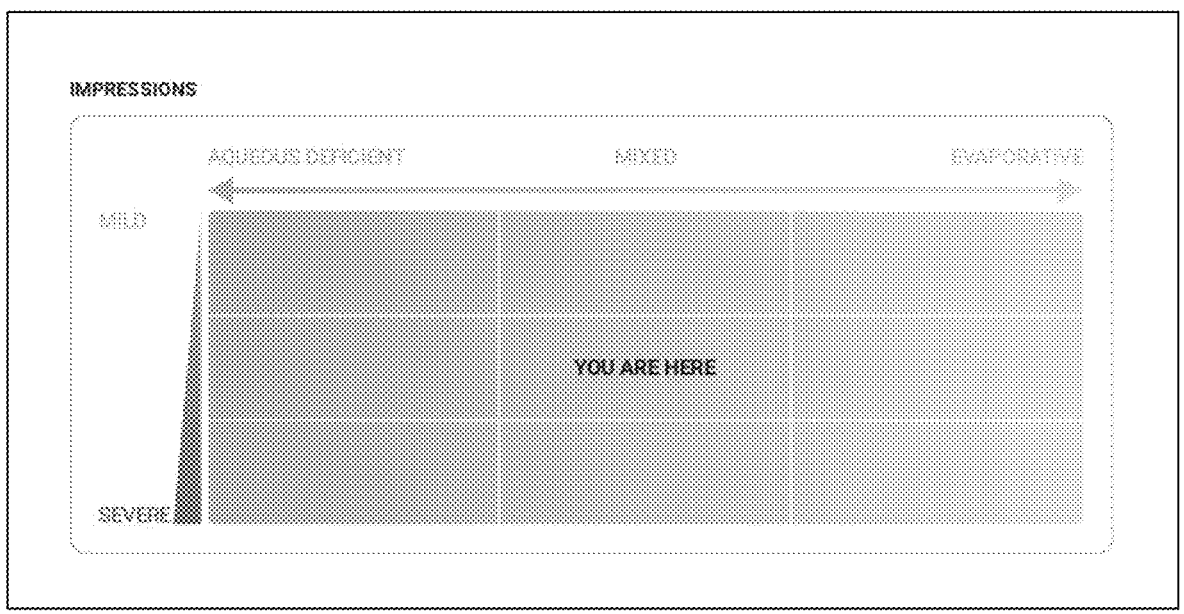
FIG. 2 illustrates an example table for categorization of the type of dry-eye process, according to some embodiments.

FIG. 2 illustrates an example table 200 for categorization of the type of dry-eye process, according to some embodiments. In the first iteration of the software, processes herein can subdivide dry-eye process into nine (9) categories that are superimposed on graphical chart where the patient's data based on thirty (30) variables are recorded. The input of each variable can be standardized. The variables can then be used for both regression and/or predictive analysis to determine the type of dryness the patient. The medical practitioner can override the recommended therapy based on their expertise. This action can be fed back to the machine learning model for further learning.

FIG. 3 illustrates an example table 300 with recommended therapies for an example type of dry-eye disease, according to some embodiments. Once the type of dryness is determined, a specific combination of therapies can be selected and/or ranked. These therapies can be selected based on a list of the most effective therapies for the example type of dry-eye category. Any mimickers detected through the standardized set of tests can be used to alert the user of risk of a condition that mimics dry eyes but is not truly dry eyes.

Figure 4B:
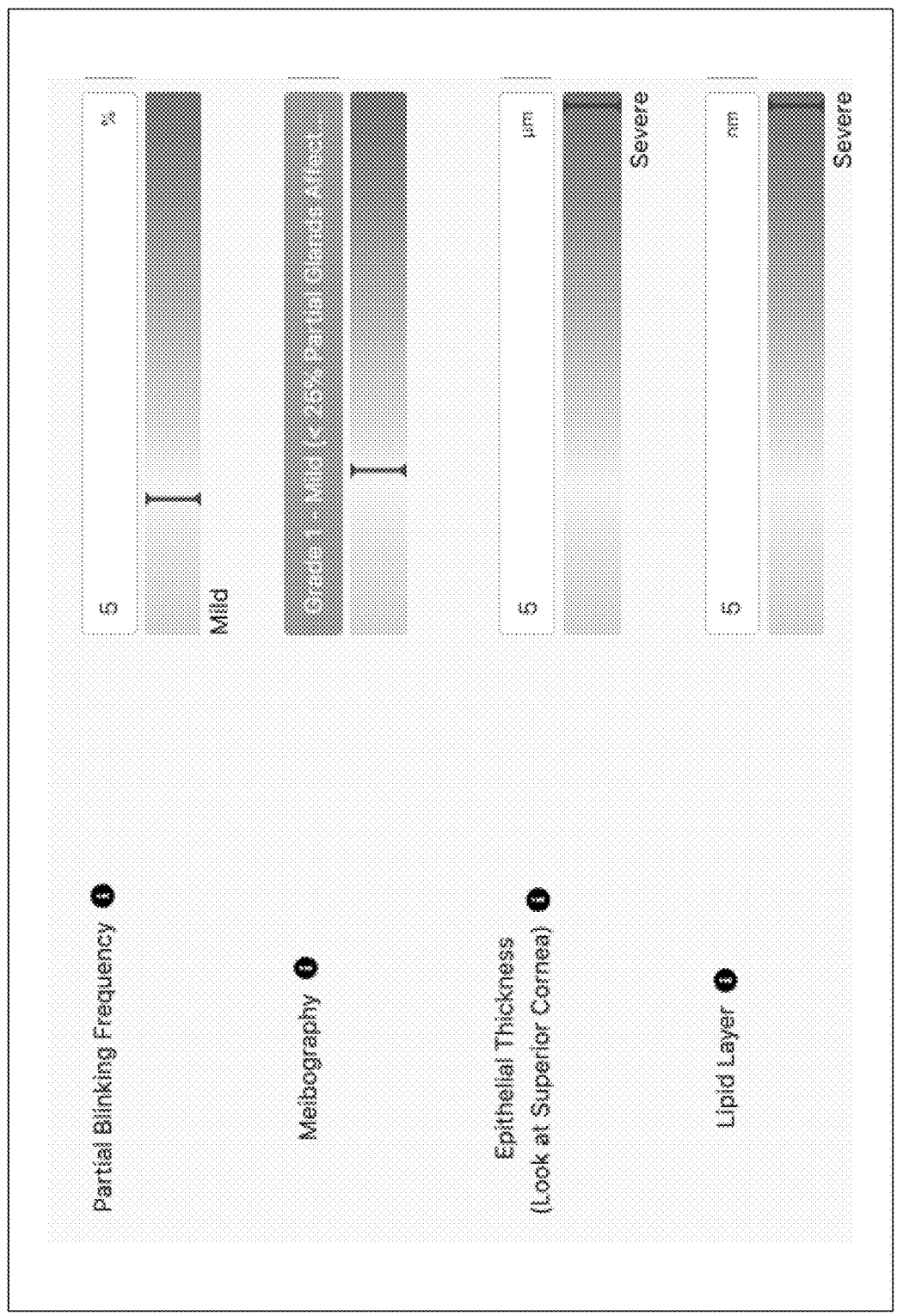
FIGS. 4 A-B illustrates an example user interface for setting the input variables related to dry-eye conditions, according to some embodiments.

FIGS. 4 A-B illustrates an example user interface for setting the input variables related to dry-eye conditions, according to some embodiments. The medical practitioner can be provided with an application. The application can include a slider input for each variable related to the diagnoses. The input slider input can be converted to a standardized quantifiable value as shown. The input sliders can be provided for each eye. Additional metrics can be displayed. In some embodiments, the input sliders can also be dynamically ranked with a machine-learning algorithm based on the previous input and/or historical input.

It is noted that U.S. Provisional Patent Application No. 62/856,145 (e.g. FIG. 5 of said provisional application) illustrates an example screenshot for dry eye category selection/classification, according to some embodiments. Machine-learning techniques can be applied to the input variable values and a type and severity of user's dry eye can be determined. The type and severity of user's dry eye can be displayed in the table format. Based on the type and severity of user's dry eye various protocols, treatments, and the like can be provided and monitored by a dry-eye management application.

Figure 5:
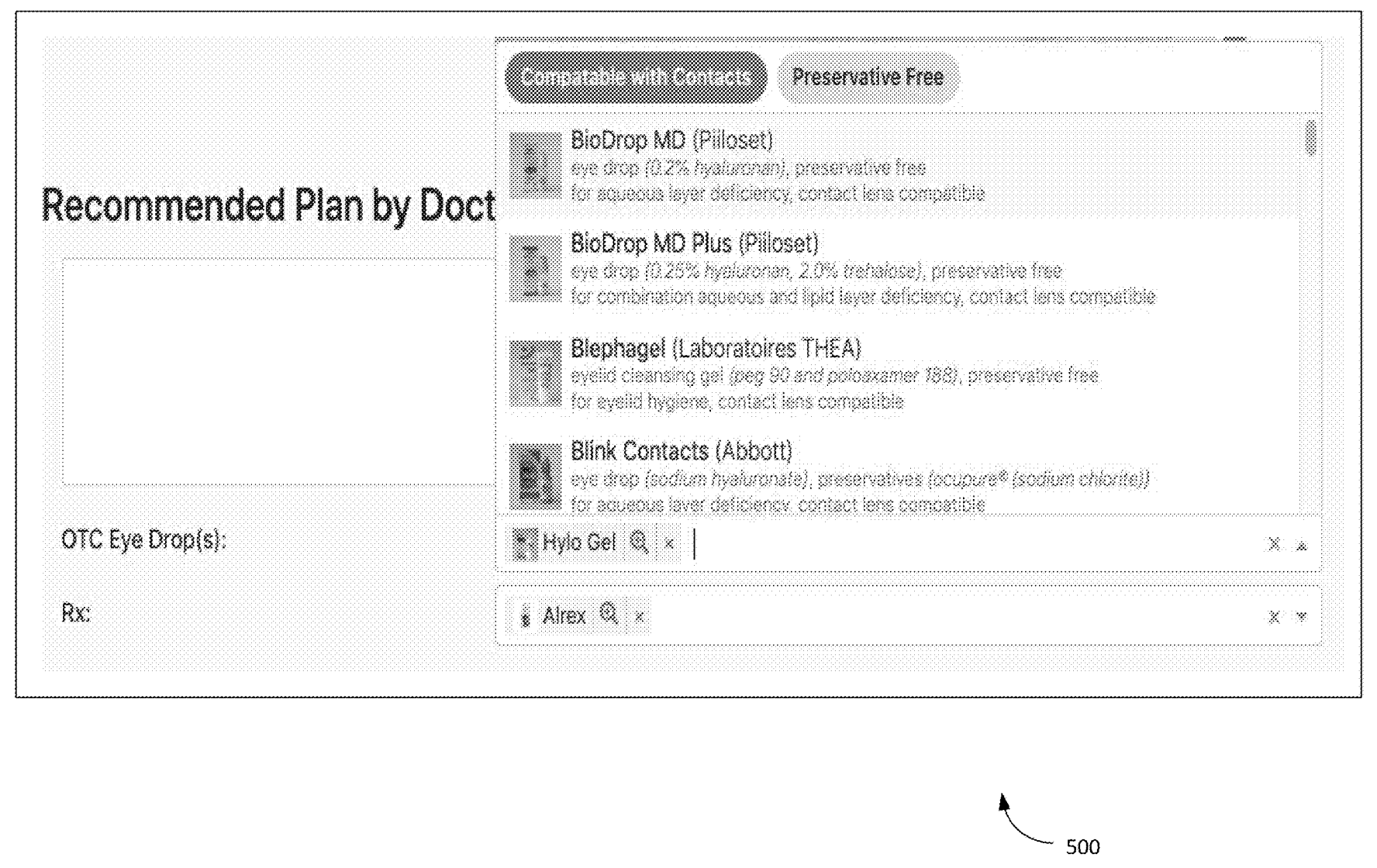

FIG. 5 illustrates an example screenshot for dry eye therapy and/or drop selection, according to some embodiments. A dry-eye management application can provide a scrolling view of selectable therapies have been determined to be useful for the particular patient by an application machine-learning algorithm. Patients and/or medical practitioners can select one or more therapies.

Figure 6:
FIG. 6 illustrates an example screenshot of an eye-drop product detail in internal eye-drop products database, according to some embodiments.

FIG. 6 illustrates an example screenshot of an eye-drop product detail in internal eye-drop products database, according to some embodiments. This information can also be pushed to the patients via a dry-eye management application (e.g. see infra) based on the output of dry eye therapy and/or drop selection process. Patients can record medication use in the dry-eye management application. This information can then be placed in the patient's treatment history and/or sent to the medical practitioner.

Figure 7:
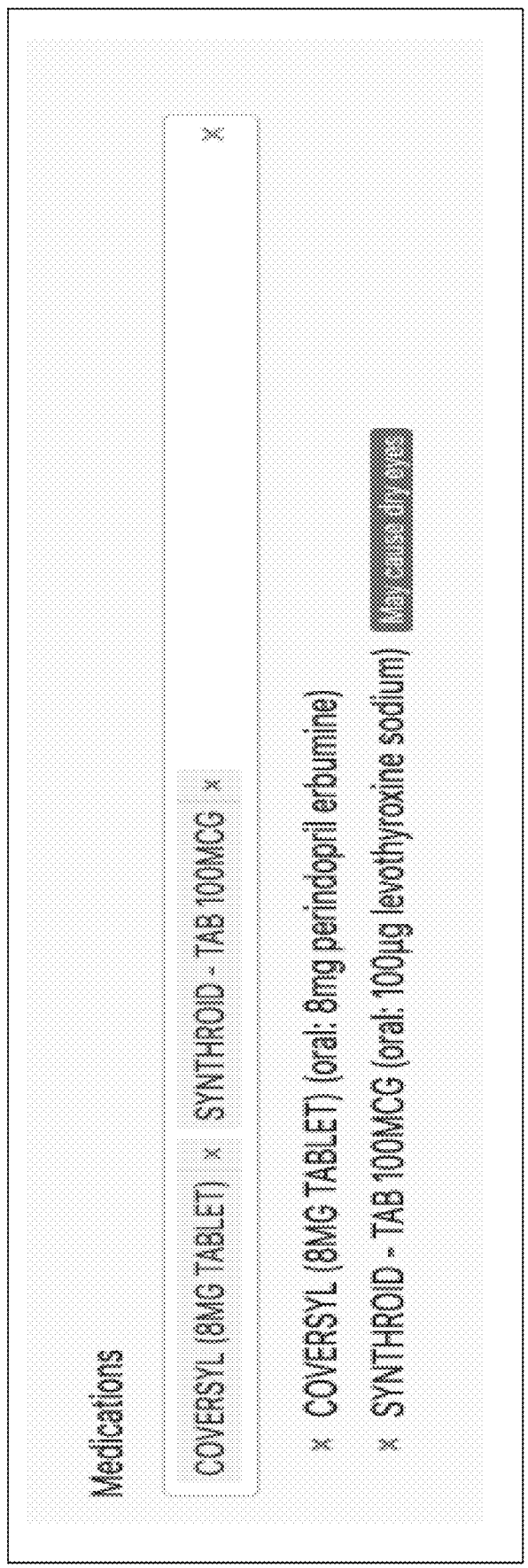
FIG. 7 illustrates an example of a display of dry-eye side effect flagging on medications, according to some embodiments.

FIG. 7 illustrates an example of a display of dry-eye side effect flagging on medications, according to some embodiments. A dry-eye management application can scan a user's medical history, pharmaceutical history, etc. and determine a set of candidate dry-eye catalysts. For example, the user can be on a medication that causes dry eye. The dry-eye management application can scan the user's medications (e.g. in a database obtained from the user's medical practitioner, pharmacy, etc.) and flag medications with dry eyes as a side effect. This information can also be pushed to the patients and/or medical practitioners via the dry-eye management application.

All the information obtained from process 100 and/or the inputs of FIGS. 2-7 can be saved for future machine-learning optimizations and/or training processes. The dry-eye management application can also use the sensors of a user's mobile device and/or other computing devices to periodically obtain data about a user. For example, dry-eye management application can record screen time on mobile devices, game stations, etc. The dry-eye management application can use user facing cameras to determine a user blink rate and blink quality. The dry-eye management application can record user locations and obtain humidity data about said locations. This information can be provided to medical practitioners and/or input as variables into process 100. Process 100 can be used to implement the examples of FIGS. 2-7.

Example Systems

Figure 8:
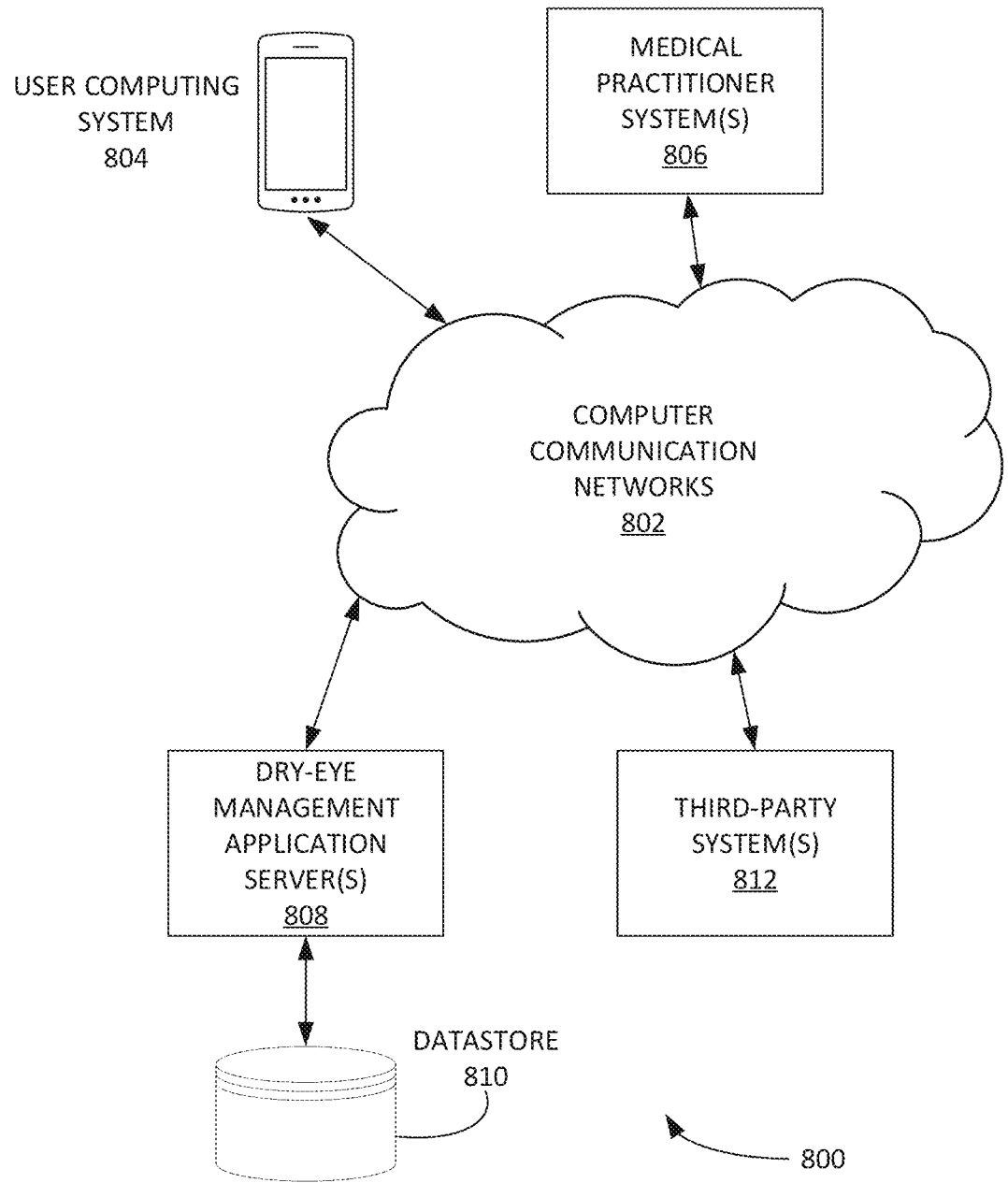
FIG. 8 illustrate an example dry-eye management system, according to some embodiments.

FIG. 8 illustrate an example dry-eye management system 800, according to some embodiments. Computer communication networks 802 can be a data network (e.g. a telecommunications network) that allows computers to exchange data. Computer communication networks 802 can be a TCP/IP network such as the Internet. Computer communication networks 802 can be wide area networks, enterprise private networks, virtual private network, cellular data networks, local area networks, etc.

Dry-eye management system 800 can include user-side computing system(s) 804. User-side computing system(s) 804 can include a dry-eye management application. Dry-eye management application can obtain user dry-eye and/or other relevant information. Dry-eye management application can be used to display various user-side dry-eye management user interfaces, such as those provided supra. Dry-eye management application can communicate data to dry-eye management server(s) 508. User-computing system 804 can be a laptop computing, personal computer, mobile device (e.g. smart phone, tablet computer, wearable computing device, head-mounted display device, etc.), etc.

Dry-eye management system 800 can include medical-practitioner computing system(s) 806. Medical-practitioner computing system(s) 806 a medical-practitioner version of the dry-eye management application. Medical practitioners can use the medical-practitioner version of the dry-eye management application to upload diagnosis variables (e.g. see FIGS. 4 A-B, etc.). Medical practitioner dry-eye management application can communicate data to dry-eye management server(s) 508.

Dry-eye management server(s) 508 can obtain data input by medical practitioner via the medical-practitioner version of the dry-eye management application. Dry-eye management server(s) 508 can obtain data input by users via the dry-eye management application as well. Dry-eye management server(s) 508 can include a technical computing system—including neural networks, machine learning, image processing, geometry, AI, data science, visualizations, etc. Dry-eye management server(s) 808 can be used to implement the server-side calculations and functionalities of process 100 and FIGS. 2-7. User/patient data can be stored in datastore 810. Data can be anonymized, standardized, etc. and used in various machine-learning training models as training data in order to make/optimize the various predictions and/or decisions implemented by the functionalities (e.g. diagnosing, analysis, monitoring, ranking, suggestion, ordering, etc.) used herein.

In one example, dry-eye management server(s) 508 can be linked to dry-eye management application(s) operative in user-computing system 804 and/or medical-practitioner computing system(s) 806. The dry-eye management application can be operative in a smart phone or other mobile device. The dry-eye management application can be used the smart phone systems (e.g. digital cameras, etc.) to measure a patient's blinking rate along with other evidence of lagophthalmos The dry-eye management application can be used in conjunction with a dry-eye analysis system operative in dry-eye management server(s) 508. The dry-eye analysis system can use the video camera feed to record the number of blinks that a patient performs in a specified time (e.g. 60-minute span). The dry-eye analysis system can recognize full blinks when eyelids are completely closed using a blink-detection algorithm designed for blink detection. The dry-eye analysis system can measure both blinking rate and presence to simultaneously measure both conditions. The patient is also asked to close the eyes and the dry-eye analysis system can recognize areas of opening between the eyelids that suggest lagophthalmos.

In another example, The dry-eye analysis system can detect blinking while a patient is watching a video playing on screen to ensure a natural depiction of the patient's blink rate. The patient can be prompted to view a 60 second video segment that simulates a physiologic rate of blinking. Following the viewing, the medical practitioner can be prompted query the patient to gently close their eyes for 30 seconds. The dry-eye analysis system can detect evidence of intelpaberal fissure suggesting lagophthalmos.

Dry-eye management server(s) 806 can manage the use of a camera system integrated with a smart phone and linked to a software that allows for detection of intelpebral fissure space denoting lagophthalmos. Dry-eye management server(s) 806 can use specified methodology and/or a set of machine learning algorithms that input data derived from direct observations from a medical practitioner and/or obtain quantitative recordings from other technologies commonly used in dry eye measurements. Dry-eye management server(s) 806 can use lagophthalmos detection software to determine type and severity of dry eye disease. Dry-eye management server(s) 806 can use machine learning to analyze data gathered from thousands of patients to be able to determine which therapies in the particular category of dry eye disease responded best to which therapies and refine our recommendation strategies based on the type of dryness level and type detected.

Third-party system(s) 812 can include various systems with information and/or functionalities utilized by the systems and processes provided herein. For example, third-party system(s) 812 can include pharmaceutical company servers/databases. These can be accessed to obtain various information about drugs used in a treatment. Third-party system(s) 812 can include web servers, database managers, geo-location systems, libraries of mathematical elementary functions and special functions, machine-learning services, digital image editing systems, video-sharing websites, e-commerce management/payment systems, etc.

Machine Learning Processes and Systems

Figure 9:
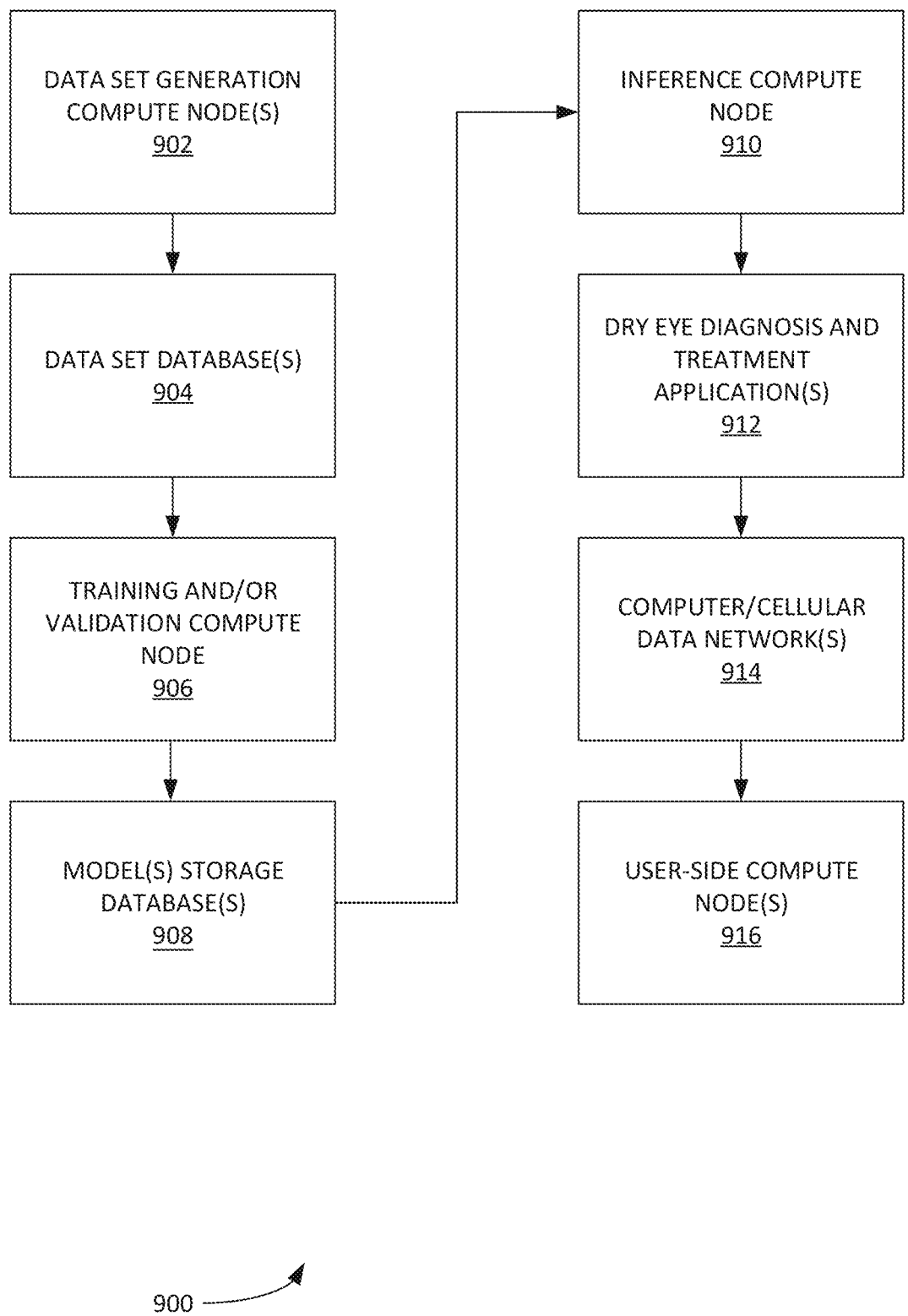
FIG. 9 depicts an exemplary computing system that can be configured to perform any one of the processes provided herein.

FIG. 9 is a schematic representation of an exemplary hardware environment 900, according to some embodiment. The hardware environment 900 includes a dataset generation compute node 902 that is employed to obtain various information related to dry eyes from a user, medical professional, etc. This information can be used to build a dataset. In various embodiments the dataset generation compute node 902 is a server but can be any computing device with sufficient computing capacity such as a server, personal computer, or smart phone. The dataset generation compute node 902 can add non-synthetic, i.e., real-world images and/or video and/or (non)synthetic data to the dataset. This can include images of a user's eyes, user input into a dry eye diagnosis and/or treatment application(s) 912. Dry eye diagnosis and/or treatment application(s) 912 can be implemented in user-side computing systems 808 and/or dry-eye management application server(s) 808. The dataset generation compute node 902 can store the dataset to a database 104 (e.g. can be located in data store 810.

A training and/or validation compute node 906, which can be the same compute node as dataset generation compute node 902, in some embodiments, accesses the database 904 in order to utilize the dataset to train deep learning models (and/or other ML models/algorithms utilized herein) to produced trained model files in a trained model storage database(s) 908. The training and/or validation compute node 906 can optionally also validate deep learning models (and/or other ML models/algorithms utilized herein).

A user employing inference computer node(s) 910 can upload dry eye related data (e.g. an image or video of the user's eyes, user medical treatment history, user questionnaire data, etc.), including a target therein, to dry-eye diagnosis and treatment application(s) 912. This information can be communicated across a network like the computer/cellular data networks 914, where dry-eye diagnosis and treatment application(s) 912 hosts a search engine, for example a visual search engine or recommendation engine, and/or an application like an automatic image tagging application. In response to a request from user-side compute node(s) 916, such as a mobile phone or PC, to find information on the target, such as a digital images of the user's eyes, medical information, biosensor data, medical history, doctor's notes, etc., and/or to tag the image, dry-eye diagnosis and treatment application(s) 912 connects user-side compute node(s) 916 to inference computer node(s) 910, which can be the same compute node as either the dataset generation compute node 902 and/or training and/or validation compute node 906, in some embodiments. Inference computer node(s) 910 uses trained model storage database(s) 908 to infer answers to the queries posed by user-side compute node(s) 916 and transmits the answers back through dry-eye diagnosis and treatment application(s) 912 to user-side compute node(s) 916. user-side compute node(s) 916 can include, inter alia: patient mobile devices, medical care provider mobile devices, etc. FIGS. 2-8 illustrate various screen shots that can be displayed with user-side compute node(s) 916. System 900 can be used to implement process 1000 infra.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

More specifically, current methods and systems can utilize process 900 to integrate ML algorithms with a dry-eye diagnosis and treatment application(s) 912 to provide a data-driven decision-making platform for diagnosing and managing dry eye cases.

Figure 10:
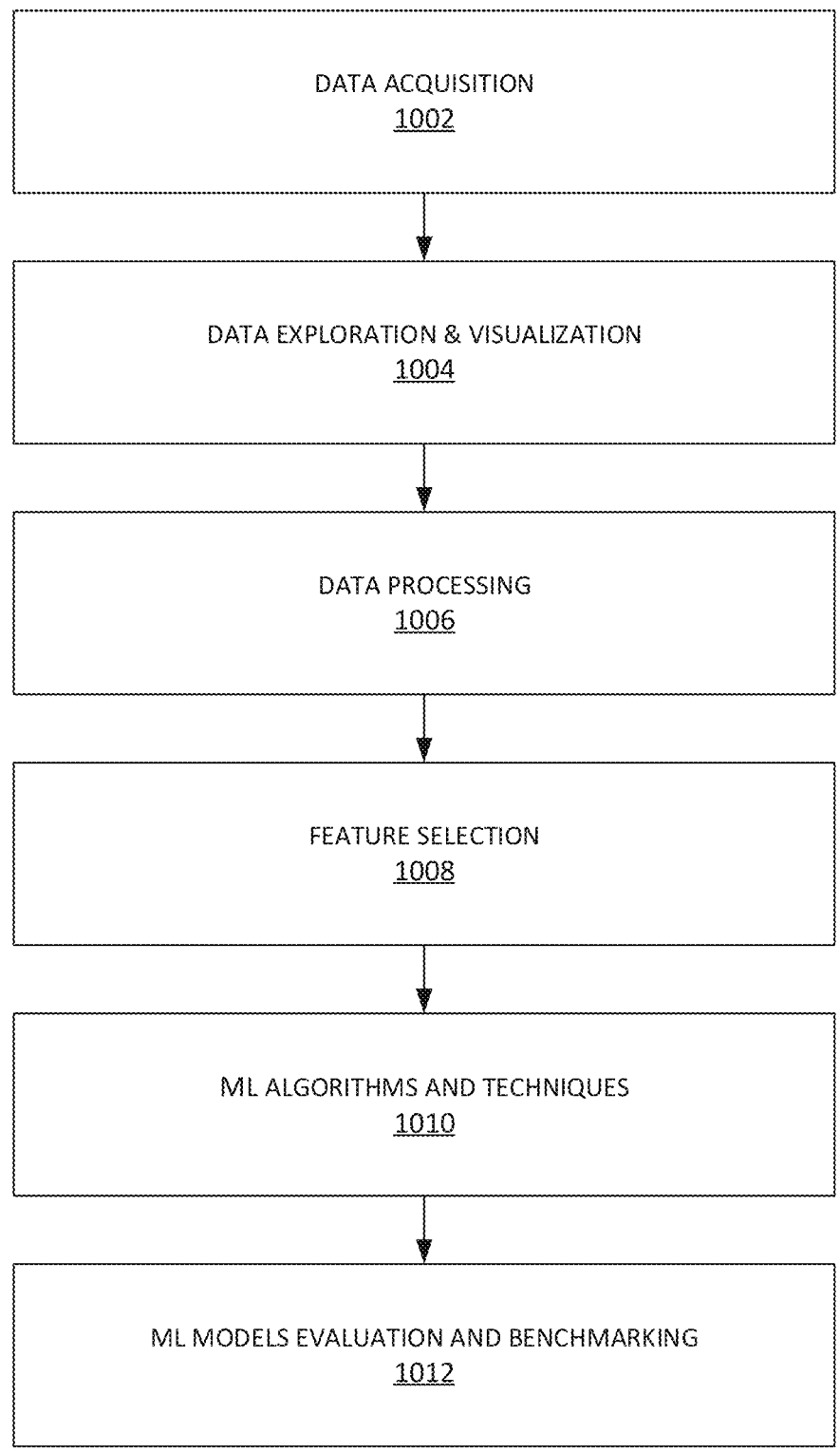
FIG. 10 illustrates an example process 1000 for integrating ML learning algorithms with a dry-eye diagnosis and treatment application(s) 912, according to some embodiments.

FIG. 10 illustrates an example process 1000 for integrating ML learning algorithms with a dry-eye diagnosis and treatment application(s) 912, according to some embodiments.

In step 1002, process 1000 can acquired dry eye patient data related to diagnosing and/or treating dry eye pathologies in a user. Step 1002 can also acquire data for training and/or updating various relevant ML algorithms. Example data acquisition processes and systems are discussed supra. In some embodiments, step 1002 can acquire dry eye patient data from step 102 supra.

In step 1004, process 1000 can implement data exploration and visualization steps. It is noted that the acquired dry eye patient data had hundreds of well-structured samples, where each sample had dozens of features. The samples can be annotated by domain experts. Process 1000 can identify and/or analyze the data features by creating descriptive plots that provide an initial assessment of the data distribution, as well as, noise and outliers (e.g. using Z-Score or Extreme Value Analysis (parametric); Probabilistic and Statistical Modeling (parametric); Linear Regression Models (PCA, LMS); Proximity Based Models (non-parametric); Information Theory Models, etc.).

In step 1006, process 1000 can implement data processing (e.g. data cleaning, etc.). Process 1000 can improve the quality of data and translating it into usable information. Process 1000 can identify incomplete, incorrect, inaccurate, and/or irrelevant parts of the data and then replace, modify, or delete the dirty or coarse data. Process 1000 can implement data cleaning. The data cleaning process can include, inter alia: removing unneeded data features, typographical errors, and demo patient samples; validating and correcting values against a known list of entities; cross-checking and fuzzy validation strategies were adopted to correct records that were partially matching other existing records; handling missing values using several strategies (e.g., default value, mean, median); abstracting the data by reducing detailed data to its main points; aggregating the data by combining multiple features into a single feature; etc.

In step 1008, process 1000 can implement feature selection. Feature selection is the process of selecting a subset of relevant features for model construction. Feature selection is used for, inter alia: simplifying the ML models and make them easier to interpret; shorter training times; avoid the curse of dimensionality; enhanced generalization by reducing overfitting; etc. It is noted that the data may contain some features that are either redundant or irrelevant and can thus be removed without incurring much loss of information. It is further noted that redundant and irrelevant can be two distinct notions, since one relevant feature may be redundant in the presence of another relevant feature with which it is strongly correlated. Accordingly, process 1000 can use correlation feature selection (CFS) technique with a 0:85 threshold value to eliminate redundant and irrelevant features. Process 1000 can have fifty-eight (58) features to represent each sample.

In step 1010, process 1000 can implement ML algorithms and techniques on the output of step 1008. As noted supra, ML an application of artificial intelligence (AI) that provides the ability to automatically learn and improve from experience without being explicitly programmed. ML techniques can be categorized into three main classes, which are: unsupervised learning, supervised learning, and reinforcement learning. In one example, process 1000 can use unsupervised and/or supervised ML techniques to help to diagnose dry eye cases. In one example, process 1000 can use SVMs to fit the data of steps 1002-1008. SVM can work by plotting each feature value as a point in n-dimensional space, where n is the number of features, with the value of each feature being the value of a particular coordinate. Then, SVM can perform classification by finding the hyper-plane that differentiates the different classes very well. SVM outputs an assigned probability for each class label; this can be used to reduce the number of false positives using a threshold value. Process 1000 can use SVMs that are, inter alia: effective in handling high dimensional space data; flexible in cases where the number of features is comparable to the number of data samples; etc.

Process 1000 can use different Kernel functions, as well as, specify custom kernel functions. In one example, process 1000 can use three SVM Models, namely dry eye model of severity and amp type (MST), dry eye model of severity (MS) algorithm, and dry eye model of type(MT). The three models use the exact feature to predict class labels. However, each model predicts a different set of class labels which can be summarized as follows. MST predicts nine classes for dry eye severity and/or type, which can include, inter alia: 1) mild-aqueous, 2) mildmixed, 3) mild-evaporative, 4) moderate-aqueous, 5) moderate-mixed, 6) moderate-evaporative, 7) severe-aqueous, 8) severe-mixed, and/or 9) severe-evaporative. MS predicts three classes for dry eye severity, which are: 1) mild, 2) moderate, and 3) severe. MT predicts three classes for dry eye type, which are: 1) aqueous, 2) mixed, and 3) evaporative.

In step 1012, process 1000 can implement ML models evaluation and benchmarking. Process 1000 can use various evaluation criteria to verify the robustness of the developed models and assess the model fitting as well as predictive performance. To avoid model overfitting the model, process 1000 can split the data into training and testing sets. In one example, process 1000 can use eighty percent (80%) of the data as a training set while the remaining twenty percent (20%) as a testing set for performance evaluation. To evaluate the quality of developed models in predicting dry eye classes, process 1000 can first calculate the confusion matrix evaluation metrics. The confusion matrix is a technique for summarizing the performance of a classification algorithm. The confusion matrix, CM can be an n×n matrix, where n is the number of classes. The left axis in the confusion matrix shows the true class, as known in the test set, and the top axis shows the class assigned to an item with that true class.

Each value $CM_{i,j}$ of the matrix can be the number of items with true class i that were classified as being in class j. The confusion elements for each class are defined as true positives (TP), true negatives (TN), false positives (FP), and false negatives (FN). To put these evaluation metrics into context, process 1000 can define the confusion elements for a class called (mild) while having three classes (mild, moderate, severe) as follows. TP can be samples that are actually "mild" and were classified as "mild". FP can be samples that are actually belonging to "moderate" or "severe" and were classified as "mild". FN can be samples that are actually "mild" but were classified as "moderate" or "severe". TN can be samples that are actually belonging to "moderate" or "severe" and were not classified as "mild". As for the performance comparison, process 1000 can use Precision (Prec), Recall (Rec), and F1-score (F1)evaluation metrics. In information retrieval, Prec is a measure of result relevancy, while Rec is a measure of how many truly relevant results are returned.

A model with high Rec but low Prec can returns a plurality of results, but most of its predicted labels are incorrect when compared to the training labels. A model with high Prec but low Rec is just the opposite, returning very few results, but most of its predicted labels are correct when compared to the training labels. An ideal system with high Prec and high Rec can return many results, with all results labeled correctly. Prec and Rec can be calculated as follows:

$$Prec = \frac{TP}{TP + FP}$$

$$Rec = \frac{TP}{TP + FN}$$

$$F1 = 2 \times \frac{\text{Precision} \times \text{Recall}}{\text{Precision} + \text{Recall}}$$

The precision-recall curve can be a useful measure of success of prediction, especially when the classes are very imbalanced. It shows the tradeoff between Prec and Rec for different thresholds. A high area under the curve represents both high Rec and high Prec, where high Prec relates to a low false positive rate, and/or high Rec relates to a low false negative rate. High scores for both show that the model is returning accurate results (high Prec), as well as returning a majority of all positive results (high Rec). It is noted that the Prec may not decrease with Rec. The definition of Prec shows that lowering the threshold of a model may increase the denominator by increasing the number of results returned. If the threshold was previously set too high, the new results may all be true positives, which can increase Prec. If the previous threshold was about right or too low, further lowering the threshold can introduce false positives, decreasing Prec. However, Rec may not depend on the model threshold, which means that lowering the model threshold may increase Rec, by increasing the number of true positive results. It is also possible that lowering the threshold may leave Rec unchanged, while the Prec fluctuates. The relationship between Prec and Rec can be observed in the stairstep area of the plot—at the edges of these steps, a small change in the threshold considerably reduces Prec, with only a minor gain in Rec. Moreover, average precision score (AP) summarizes the precision-recall curve as the weighted mean of precisions achieved at each threshold, with the increase in Rec from the previous threshold used as the weight:

$$AP = \sum_n Rec_n - | Rec_n - 1 Prec_n$$

where $Prec_n$ and $Rec_n$ are the precision and recall at the $n^{th}$ threshold. It is noted that this evaluation metric is not interpolated and/or is different from computing the area under the precision-recall curve, which uses linear interpolation and can be too optimistic. Finally, process 1000 can calculate the Area Under Curve—Receiver Operator Characteristic (AUC-ROC), which is one of the primary classification performance evaluation metrics. AUC-ROC curves typically feature true positive rate on the y-axis and false positive rate on the x-axis. This means that the top left corner of the plot can be the "ideal" point, a false positive rate of zero, and a true positive rate of one. The steepness of AUC-ROC curves is also important since it is ideal for maximizing the true positive rate while minimizing the false positive rate. Another evaluation measure for multi-label classification is macro-averaging, which gives equal weight to the classification of each class.

The MST model can predict nine classes for dry eye severity and type which are: 1) mild-aqueous, 2)mild-mixed, 3) mild-evaporative, 4) moderate-aqueous, 5) moderate-mixed, 6) moderate-evaporative, 7) severe-aqueous, 8) severe-mixed, and 9) severe-evaporative. The MST's confusion matrix using a threshold value of 0.2 is:

$$CM_{MST} = \begin{bmatrix} 0 & 0 & 0 & 0 & 0 & 0 & 0 & 0 \\ 3 & 0 & 0 & 0 & 0 & 2 & 0 & 0 \\ 5 & 1 & 6 & 0 & 2 & 8 & 1 & 0 \\ 2 & 0 & 0 & 0 & 1 & 1 & 0 & 0 \\ 8 & 3 & 1 & 0 & 2 & 0 & 0 & 0 \\ 18 & 0 & 7 & 0 & 3 & 21 & 3 & 3 \\ 5 & 0 & 0 & 0 & 1 & 0 & 2 & 0 \\ 18 & 0 & 0 & 0 & 3 & 14 & 2 & 4 \end{bmatrix}$$

where columns and rows represent the classes in the same order mentioned above. The F1 score using the same threshold value above is twenty-three percent (23%). The AP micro-averaged score over all classes is twenty-seven percent (27%), while the AUR-ROC micro-averaged scoreover all classes is seventy-one percent (71%).ax.

The MS model predicts three classes for dry eye severity which are: 1) mild, 2) moderate, and 3) severe. The MS's confusion matrix using a threshold value of zero point two (0.2) is:

$$CM_{MS} = \begin{bmatrix} 6 & 15 & 0 \\ 32 & 37 & 8 \\ 13 & 18 & 21 \end{bmatrix}$$

where columns and rows represent the classes in the same order mentioned above. The F1 scoreusing the same threshold value above is 42.66%. The AP micro-averaged score over all classes is fifty-eight percent (58%), while the AUR-ROC micro-averaged scoreover all classes is seventy-nine percent (79%).

The MT model predicts three classes for dry eye type which are: 1) aqueous, 2) mixed, and 3) evaporative. The MT's confusion matrix using a threshold value of 0.2 is:

$$CM_{MT} = \begin{bmatrix} 0 & 0 & 0 \\ 3 & 11 & 14 \\ 9 & 5 & 108 \end{bmatrix}$$

where columns and rows represent the classes in the same order mentioned above. The F1 score using the same threshold value above is seventy-nine point three-three percent (79.33%). The AP micro-averaged score over all classes is ninety-two percent (92%), while the AUR-ROC micro-averaged score overall classes is ninety-six percent (96%).

Process 1000 can use two different models for dry eye category (mild, moderate, severe) and type (aqueous, mixed, evaporative). Process 1000 can also use combining dry eye category and type in one model (mild-aqueous, mild-mixed, mild-evaporative, moderate-aqueous, moderate-mixed, moderate evaporative, severe-aqueous, severe-mixed, severe-evaporative). However, using either one model or two models would not be an issue when integrating this project outcomes (e.g. with a CSI Dry Eye application, etc.). Additionally, deep-learning techniques can be used in some embodiments.

Additional Systems and Architecture

Figure 11:
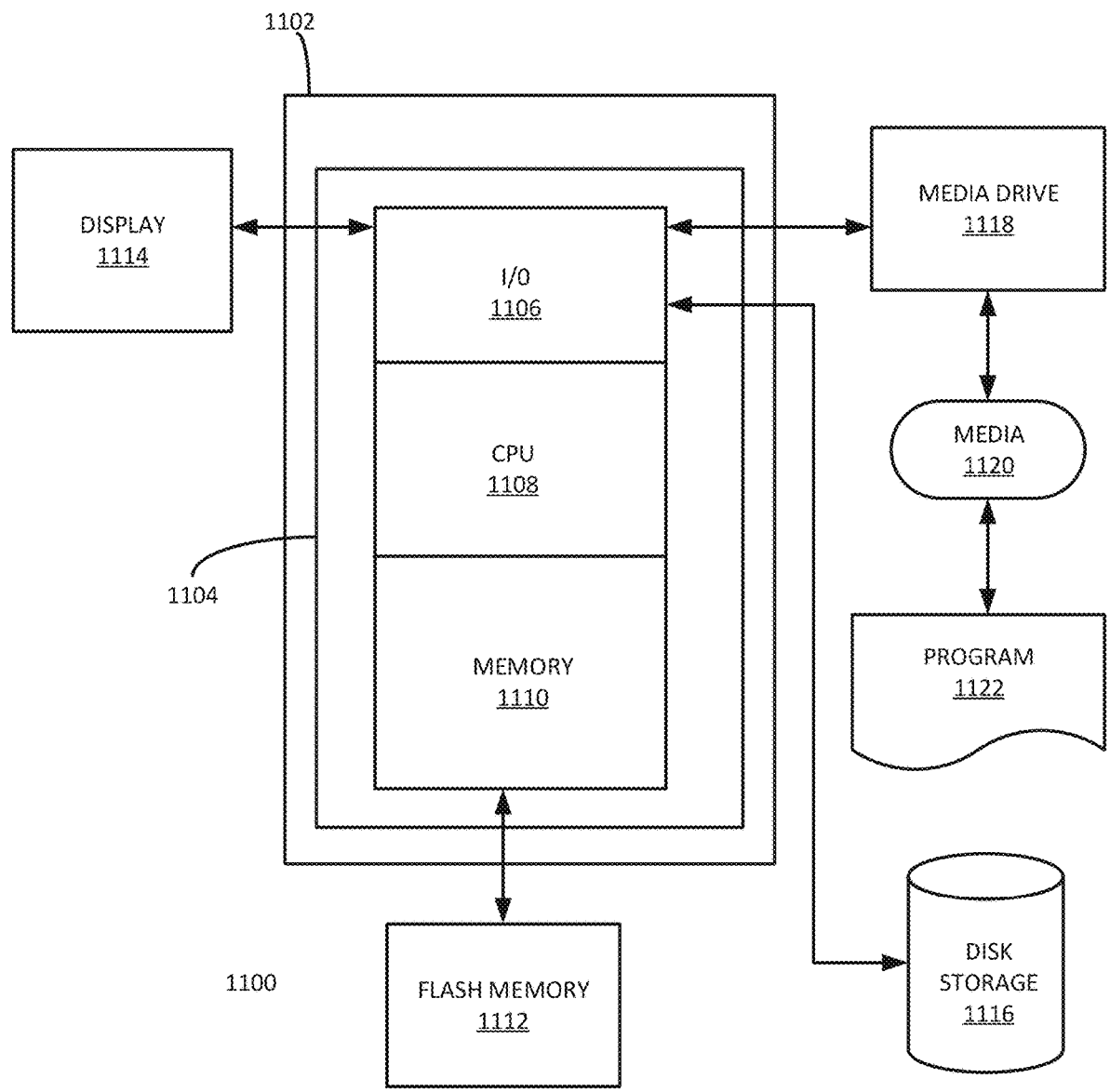
FIG. 11 depicts an exemplary computing system 1100 that can be configured to perform any one of the processes provided herein.

FIG. 11 depicts an exemplary computing system 1100 that can be configured to perform any one of the processes provided herein. In this context, computing system 1100 may include, for example, a processor, memory, storage, and I/O devices (e.g., monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Computing system 1100 can include various ophthalmological sensors, digital cameras, etc. for obtain patient eye data (not shown for brevity).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method comprising:
   obtaining a set of eye data of a patient from a medical practitioner in a computer input form;
   acquiring a set of dry eye patient data from a set of well-structured dry eye patient data samples, wherein each sample dry eye patient data comprises a plurality of features;
   identifying the plurality of data features in the set of well-structured dry eye patient data samples, wherein the step of identifying the plurality of data features in the set of well-structured dry eye patient data samples further comprises:
   identifying one or more specified data features by creating a plurality of descriptive plots that provide an initial assessment of the data distribution, data noise and one or more data outliers,
   wherein each sample is annotated by at least a domain expert to generate a set of feature annotations for each sample, and
   wherein the set of feature annotations for each sample is included in the plurality of data features;
   implementing a data cleaning process on the set of well-structured dry eye patient data samples;
   implementing a feature selection on the set of well-structured dry eye patient data samples, wherein the feature selection comprises selecting a subset of relevant features for machine-learning model construction;
   providing a specified machine-learning (ML) model;
   training the ML model with the set of well-structured dry eye patient data samples;
   validating the ML model with the set of well-structured dry eye patient data samples;
   providing the set of eye data of the patient to the trained and validated ML model;
   with the trained and validated ML model, classifying the set of eye data of the patient as a dry eye category and a dry eye type, and wherein a dry eye classification comprises the dry eye category and the dry eye type;
   wherein the specified ML model comprises three support vector machine (SVM) Models: a dry eye model of severity and amp type (MST), a dry eye model of severity (MS), and dry eye model of type (MT),
   wherein the dry eye model of severity and amp type (MST) classifies the set of eye data as mild-aqueous, mild-mixed, mild-evaporative, moderate-aqueous, moderate-mixed, moderate-evaporative, severe-aqueous, severe-mixed, and severe-evaporative, wherein an MST model confusion matrix is provided with a threshold of 0.2 and an MST Under Curve-Receiver Operator Characteristic (AUC-ROC) is calculated and used as an MST primary classification performance evaluation metric,
   wherein the dry eye model of severity (MS) classifies the set of eye data of the patient as mild, moderate, or severe, wherein an MS model confusion matrix is provided with a threshold of 0.2 and an MS AUC-ROC is calculated and used as an MS primary classification performance evaluation metric,
   wherein the dry eye model of type (MT) classifies the set of eye data of the patient as aqueous, mixed, or evaporative, wherein an MT model confusion matrix is provided with a threshold of 0.2 and an MT Under Curve AUC-ROC is calculated and used as an MT primary classification performance evaluation metric,
   integrating the MST model classification or the MS model classification and the MT model classification into the dry eye classification based on the MST Under Curve AUC-ROC, or the MS Under Curve AUC-ROC and the MT Under curve AUC-ROC;
   recommending a therapy based on the dry eye classification;
   providing an ML model's reasoning behind the recommended therapy to a medical practitioner, wherein the recommended therapy is provided in a human-readable format, wherein the ML model's reasoning comprises list of variables affecting the recommended therapy, and wherein there is a selection between either the MST model classification or the MS model classification and the MT model classification and either option is then integrated into the dry eye classification.

2. The computerized method of claim 1, wherein the set of eye data is inputted by a medical practitioner using a computer to input the set of data recorded according to a standardized set of measurements implemented in a specified sequence during an optical exam.

3. The computerized method of claim 1,
wherein the plurality of data features comprises a parametrically distributed population, and
wherein the plurality of descriptive plots comprises a Z-Score based plot, an Extreme Value Analysis based plot or a Probabilistic and Statistical Modeling algorithm-based plot.

4. The computerized method of claim 1,
wherein the plurality of data features comprises a non-parametrically distributed population, and
wherein the plurality of descriptive plots comprises a Proximity Based Models plot.

5. The computerized method of claim 1, wherein the feature selection comprises a correlation feature selection (CFS) process.

6. The computerized method of claim 5, wherein the CFS process comprises using zero to eighty-five (0:85) threshold value to eliminate redundant and irrelevant features.

7. The computerized method of claim 1, wherein the SVM performs classification by determining a hyper-plane that differentiates a set of different classes of dry eye.

8. The computerized method of claim 1, wherein the SVM outputs an assigned probability for each class label that is used for dry eye category and dry eye type classification.

9. The computerized method of claim 8, wherein the assigned probability for each class label is used to reduce the number of false positives using a specified threshold value.

10. The computerized method of claim 1, wherein the trained and validated ML model comprises a combined dry eye category model and dry eye type model.

11. The computerized method of claim 10, wherein the combined dry eye category model and dry eye type model classifies the set of eye data of the patient as mild-aqueous, mild-mixed, mild-evaporative, moderate-aqueous, moderate-mixed, moderate evaporative, severe-aqueous, severe-mixed, severe-evaporative.

* * * * *